United States Patent [19]

Alfthan et al.

[11] 4,227,608
[45] Oct. 14, 1980

[54] METHOD AND AN ARRANGEMENT FOR OBTAINING A TRANSLATORY MOVEMENT BETWEEN TWO MUTUALLY CONTACTING BODIES

[76] Inventors: Björn J. V. Alfthan, Högbergsgatan 46, S-116 20 Stockholm; Karl G. Pettersson, Katarina Bangata 43, S-116 39 Stockholm, both of Sweden

[21] Appl. No.: 973,597

[22] Filed: Dec. 27, 1978

[30] Foreign Application Priority Data

Jan. 13, 1978 [SE] Sweden .............................. 78003910

[51] Int. Cl.³ ........................ B65G 35/00; B62D 57/02
[52] U.S. Cl. .................................. 198/630; 180/8 R; 180/8 C; 180/9.2 R
[58] Field of Search ............... 198/630, 955; 180/8 R, 180/8 C, 9.2 R

[56] References Cited

U.S. PATENT DOCUMENTS

| | | |
|---|---|---|
| 1,958,322 | 5/1934 | Symington . |
| 3,066,637 | 12/1962 | Akutowicz .................. 180/9.2 R X |
| 3,343,655 | 9/1967 | Howard . |
| 3,537,540 | 11/1970 | Zuppiger et al. ................ 198/630 X |
| 3,623,566 | 11/1971 | Orloff ........................................ 180/7 |
| 3,693,740 | 9/1972 | Lewis et al. .......................... 180/8 R |
| 3,985,064 | 10/1976 | Johnson ................................ 198/630 |

FOREIGN PATENT DOCUMENTS

2118125 10/1972 Fed. Rep. of Germany .
2302626 7/1974 Fed. Rep. of Germany .

*Primary Examiner*—Jeffrey V. Nase
*Attorney, Agent, or Firm*—Frishauf, Holtz, Goodman & Woodward

[57] ABSTRACT

A method of obtaining a translatory movement between two mutually contacting bodies. A wave formation is caused to move along one active portion of at least one of the bodies, which active portion is in contact with the other body. The wave formation either causes an interruption in the contact between the bodies and separates two parts of the active portion which is in contact with the other body, or forms a contact between the bodies and separates two parts of the active portion which are not in contact with the other body. The distance between two arbitrarily selected points of respective pairs of the separated parts measured along the surface of the active portion will then be longer than the shortest distance between the same points. An arrangement using the method for obtaining a translatory movement of one body relative to another with which it is in contact is also described.

13 Claims, 27 Drawing Figures

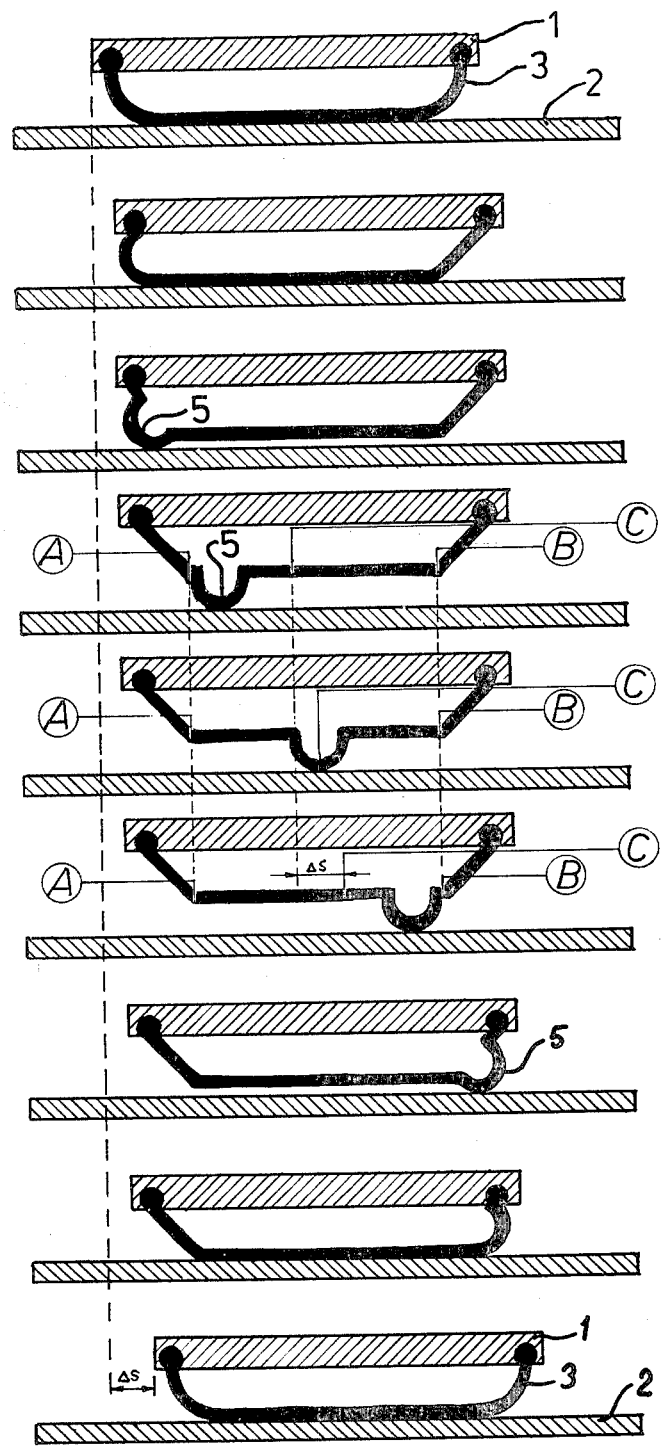

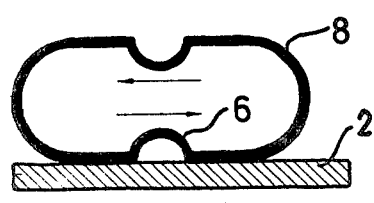 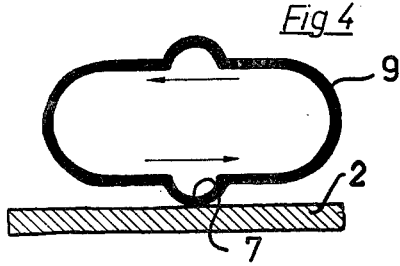
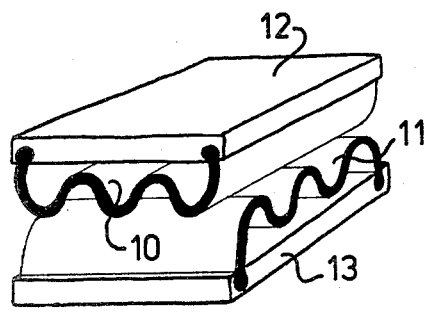 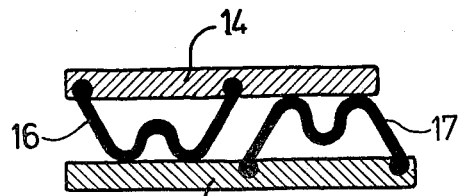
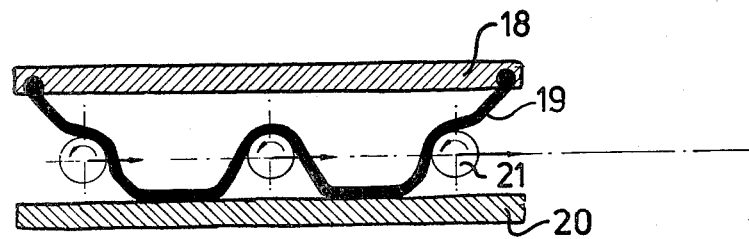
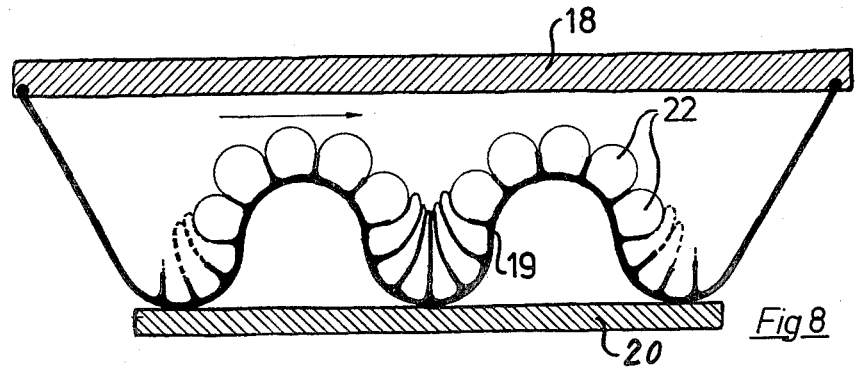

METHOD AND AN ARRANGEMENT FOR OBTAINING A TRANSLATORY MOVEMENT BETWEEN TWO MUTUALLY CONTACTING BODIES

The present invention relates to a method of obtaining a translatory movement between two mutually contacting bodies and to an arrangement for obtaining a translatory movement of one body relative to another with which it is in contact.

BACKGROUND AND PRIOR ART

When driving vehicles through wooded or rough country, the difficulties encountered in advancing the vehicle and the damage caused to the ground when driving create serious problems. Also, when advancing logs or three trunks in log-handling machines, it is difficult to effectively advance the logs without damaging the same.

The abovementioned problems can be generalised by saying that it is difficult to create movement between two mutually contacting bodies when the body contacting the driving means by which the movement is to be effected has a shape which does not favour said movement, and to move said bodies without causing damage thereto.

There are today certain known principles for creating movement between mutually contacting bodies. The principle most applied is the rolling principle. In this respect, many different apparatus are available which are equipped with wheels or belts. Movement between mutually contacting bodies can also be caused by means of walking. There are examples of mechanically driven apparatus which execute walking-like movements, and certain apparatus comprising inflatable hoses or cushions in which different forms of walking movements are achieved by inflating the hoses or cushions in accordance with different predetermined inflation patterns.

In order for apparatus which apply the rolling principle, and mechanical walking apparatus to successfully negotiate obstacles, it is necessary to make them both complicated and bulky. Such apparatus often operate with relatively small contact surfaces, and hence the contact pressure is high. Attempts to increase the contact surfaces, thereby to reduce the contact pressure, often results in large, bulky apparatus. Apparatus which use hoses or cushions of different kinds to obtain a walking-like movement have a very low advancing speed.

THE INVENTION

It is a primary object to provide a method by which a translatory movement can be obtained between two mutually contacting bodies and which can also be applied with irregularly shaped bodies and in which the contact pressure between the bodies is low and the bodies are subjected to practically no damage, and in which the aforementioned disadvantages are eliminated or greatly reduced.

Briefly at least one wave is caused to move along an active portion of at least one of said bodies, said portion contacting the other of said bodies, and in which said wave either causes the contact between said bodies to be broken and separates two parts of said active portion in contact with said other body, or forms a contact between said bodies and separates two parts of said active portion which are not in contact with said other body; and causes the distance between any two points of respective pairs of said parts measured along the surface of the active portion to be longer than the shortest distance between said points.

The invention also relates to an arrangement for use with the method of causing a tranlatory movement relative to another body with which it is in contact.

Thus, the invention is based on the use of waves in accordance with the definition above, which are advanced in an active portion which is substantially stationary relative to the body in contact therewith. The part or parts of the active portion in contact with an opposing body is or are not therewith diplaced relative thereto, and hence there is no sliding motion at the contact surface. The only movement of the active portion relative to the body with which it is in contact takes place at the part of the parts of the active portion which, as a result of the formation of the wave, is or are not at that moment in contact with said body.

By active portion is meant a portion in which waves as hereinbefore defined can be formed and moved in any direction. Thus, each wave tends to provide a relative displacement of the body with which the active portion is connected in the direction of wave propagation relative to the opposing body.

The active portion may have the form of a continuous path in which waves are caused to circulate. The waves can be created and/or propelled by means of at least one roller which is displaceable relative to the active portion. In accordance with a further embodiment, this is effected by means of pneumatically or hydraulically inflatable cushions which are filled and evacuated cyclically.

Conveniently, the active portion may comprise an outer flexible layer which at least partically defines a space having an internal pressure above the ambient pressure. Said space may, for example, be filled with an elastic material, e.g., a foamed plastics material. The wave mat may also be pre-tensioned (pre-formed) to the desired wave form.

So that the invention will be more readily understood and optional features thereof made apparent, exemplary embodiments of the invention will now be described with reference to the accompanying schematic drawings.

FIGS. 1 and 2 illustrate the principle by which a translatory movement is obtained between two mutually contacting bodies by means of a wave having a positive and a negative amplitude, respectively.

FIGS. 3 and 4 illustrate the movement of waves according to FIGS. 1 and 2, respectively, in an active portion in the form of an endless path.

FIGS. 5 and 6 illustrate examples of how two bodies having active portions may act against each other.

FIGS. 7-9 illustrate three different alternatives by which waves can be created and moved in an active portion.

Figures 1A, 1B, 1C, 1D, 1E, 1F, 1G, 1H, 1I:
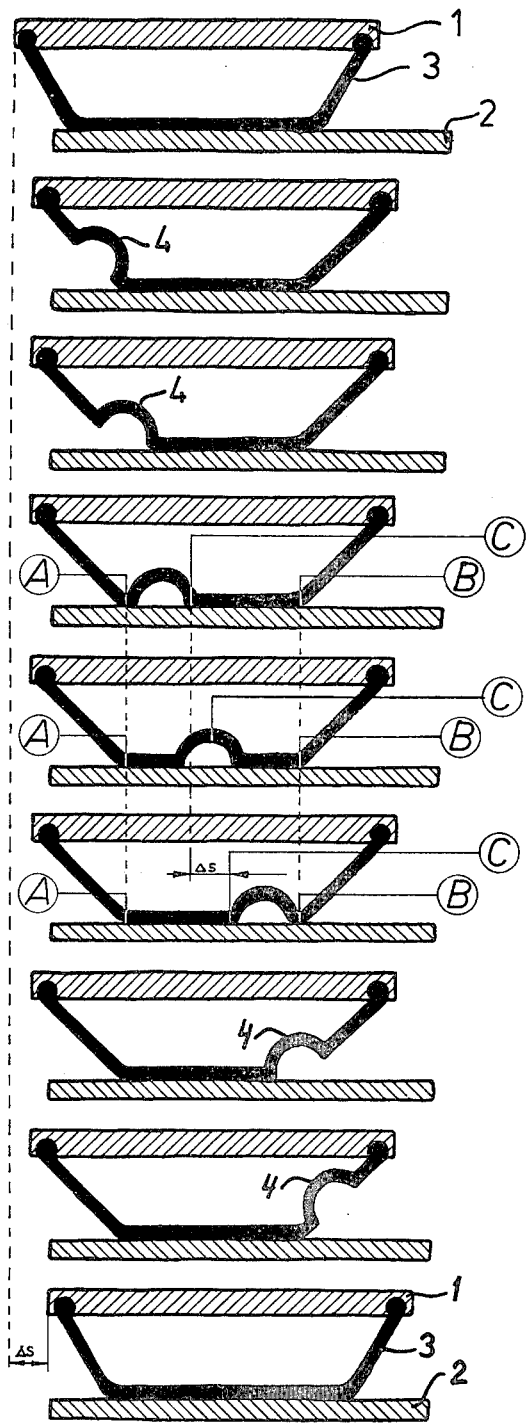

FIG. 1a is a schematic, longitudinal sectional view of an arrangement adapted to perform a translatory movement relative to another body with which it is in contact. The arrangement 1 may, for example, comprise a vehicle which is to be moved relative to a supporting surface 2. The vehicle 1 is provided with an active portion in the form of a wave mat 3 which is in contact with the surface 2 and in which waves can be formed and moved. The active portion 3 is fixed at its ends to the vehicle 1. The surface pressure is relatively low, since the weight of the vehicle is distributed over the bottom surface.

As illustrated in FIG. 1b, a wave 4 of positive amplitude is formed in the active portion 3 for the purpose of propelling the vehicle 1. The wave 4 is moved to the right as seen in the figure, as will be evident from FIGS. 1b-1h, and during movement of the wave along the active portion, an interruption will be formed between the active portion 3 and the support surface 2 such that the action portion 3 is in contact with said surface 2 at two parts which are separated by said interruption.

During passage of the wave 4 along the wave mat 3, those parts of the mat which are in contact with the surface 2 will be stationary relative thereto, and hence there is no sliding motion between the mat and the support surface. The only displacement of the mat 3 relative to the support surface 2 takes place in the wave 4, when part of the mat defining said interruption is lifted from the surface. This is illustrated in FIGS. 1d-1f, from which figures it will be seen that the points A and B on the wave mat are not moved when the wave 4 is moved between said points. An intermediate point C on the wave mat, however, will be lifted up by the wave 4 and moved back into contact with the support surface 2 at a distance $\Delta s$ in front of its previous position. This applies to all the points along the wave mat passed by the wave, and hence when a wave 4 has passing along the whole of the wave mat, the mat will have been moved a distance $\Delta s$ to the right without any sliding taking place between the mat and the support surface. Thus, as indicated in FIG. 1a, a chassis 1 connected to the mat will also have been moved through the same distance $\Delta s$.

In FIGS. 2a-2i there is illustrated in a similar manner, and with the same references as those used in FIG. 1, the manner in which a tranlatory movement is effected between two bodies with the aid of a wave which passes along an active portion of one of said bodies, e.g., a vehicle 1, said active portion having the form of a wave mat 3. As will be seen in FIG. 2, there is used in this case, however, a wave 5 of negative amplitude, the wave mat 3 only making contact with the support surface 2 at said wave, which thus separates two parts of the wave mat which are not in contact with said support surface. Similarly to the case of FIG. 1 no sliding takes place between the wave mat 3 and the support surface. In the embodiment shown in FIGS. 2d-2f, the point C on the wave mat is urged down by the wave 5 in contact with the support surface 2 at a position somewhat in front of its position relative to the support surface (as seen in the direction of wave movement) before the wave 2 reaches said point C, and is again lifted from the support surface to a position located at a further distance in front of the position in which it previously made contact with said support surface 2. Thus, also in this case, the wave mat 3, subsequent to the wave 5 travelling along the whole of the mat moves through a distance $\Delta s$.

Thus, when the wave mat 3 has been moved through a distance $\Delta s$ relative to the support surface 2 whilst a wave passes along said mat, a chassis connected to the mat will be moved through the same distance, as illustrated in FIGS. 1 and 2. In that case when only the ends of the wave mat are connected to the chassis as illustrated schematically in FIGS. 1 and 2, said movement will take place in distinctive steps. However, by connecting the wave mat to the chassis 1 along the whole of the length of the mat, e.g., by means of an elastic material, such as foamed plastics, said movement will take place successively during passage of the wave through the active portion and will be extremely uniform, especially if a multiplicity of sequential waves are applied.

Although, for the sake of simplicity, it has been assumed that the device 1 is a vehicle, it will be understood that, instead, if the device 1 is held stationary the opposing body 2 will be displaced in the opposite direction to the assumed direction of movement of the vehicle. Thus, the principle upon which the invention is based can be used to provide the desired movement between two mutually contacting bodies. In the case of movement of more than two bodies, the movement can always be divided into a number of cases of movement between two bodies.

FIGS. 3 and 4 illustrate schematically the movement of waves of positive and negative amplitude referenced 6 and 7, respectively, in a respective active portion 8 and 9 in the form of an endless path.

FIGS. 5 and 6 illustrate how two bodies each having an active portion may act against each other to achieve specific movements. In the example shown in FIG. 5, the active portions 10 and 11 of the two bodies 12 and 13, respectively, are in contact with each other, whilst in the example illustrated in FIG. 6 the active portions 16 and 17 of respective bodies 14 and 15 are in contact with nonactive portions of the other body.

Figure 9:
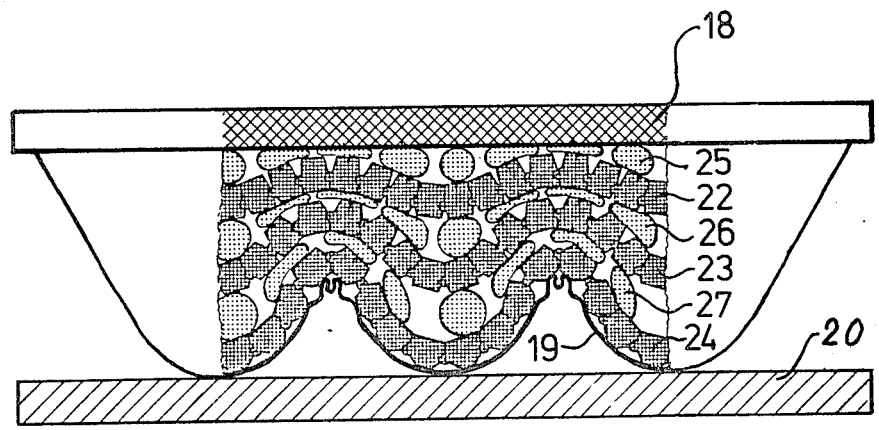

The aforedescribed FIGS. 1-4 are only intended to illustrate the principle of obtaining a movement by using waves in accordance with the invention. In practice, it should be possible to utilize continuous waves, such as sinus waves. FIGS. 7-9 illustrate schematically three exemplary methods of creating and moving continuous waves in an active portion of a vehicle.

FIG. 7 is a longitudinal view of a schematically illustrated vehicle 18 having an active position in the form of a wave mat 19. The wave mat 19 may be made of any material whatsoever, in which waves can be formed and moved. For example, the mat may be made of a flexible and strong sheet material or may include links which are pivotally joined together. The wave mat 19 is in contact with a support surface 20.

The wave mat 19 defines a closed space between said mat and the vehicle 18, in which space an internal pressure above ambient pressure prevails. As illustrated in the figure, waves can be formed by means of rollers 21, which waves can be moved relative to the vehicle 18 by displacing the freely mounted rollers 21 along the mat 19, thereby to cause displacement of the vehicle in the same manner as that illustrated in FIGS. 1 and 2. The inner over-pressure can be produced, for example, by means of gas pressure or liquid pressure, although the space may also be filled with a resilient material, such as foamed plastics, which may be bonded to the inner surface of the mat 19 and/or the vehicle 18, thereby to provide uniform movement of the vehicle.

FIG. 8 illustrates schematically an alternative manner of creating and moving waves in the wave mat 19. In this embodiment there is used a plurality of inflatable cushions 22 which are mounted close to each other and to the wave mat 19 and which can be inflated and evacuated cyclically. By inflating a suitable combinaton of adjacent cushions 22 a wave formation such as that shown in the figure can be formed when an over-pressure prevails between the upper rigid portion of the vehicle 18 and wave mat 19. This wave formation can be caused to move relative to the vehicle 18 by cyclically evacuating and inflating the cushions in sequence, as will readily be perceived by one of normal skill in the art.

As an alternative to using an inner over-pressure in the active portion, the active portion can be pre-tensioned to form the desired waves which can be moved along said portion. This can be achieved, for example, by forming the active portion from a plurality of layers pre-tensioned against each other and which layers are elastically connected together.

Such an embodiment is illustrated in FIG. 9, in which waves are formed by means of three layers 22, 23, 24 comprising links which are pivotally connected together. The upper layer 22 is longer than the rigid portion 18 of the vehicle and is attached thereto by means of elastic cushions 25, which can be inflated and evacuated cyclically. In this way, the layer 22 can be brought to the desired wave form. The underlying layers 23 and 24 are both longer than layer 22, and the layer 24 is longer than the layer 23. The layers 23 and 24 are connected to the overlying layer by means of cushions 26 and 27, respectively. The wave form is amplified from layer to layer, and in the illustrated example the wave form required for the purpose on hand has been achieved with three layers and spacious cushion volume. This wave form is transmitted to the mat 19 by the fact that the links of the underlayer 24 are fixed to the mat. If desired, however, the mat can be dispensed with. The waves obtained can be caused to move in one or the other direction by cylically inflating or evacuating the resilient cushions in a manner which is principle the same as that disclosed with reference to FIG. 8. The cushions can be inflated with gas or liquid.

An alternative method of creating a pre-tensioned wave form is to use three mutually elastically connected layers in which the centre layer is shorter than the other two layers and in which said other two layers are preferably of equal length. Such a construction will create a wave form which can be moved with the aid of external means, such as rollers, or when the elastic connection between the layers has been provided by means of inflatable cushions, by cylically inflating and evacuating said cushions in the manner described with reference to FIGS. 8 and 9. A wave mat of this kind need not abut a rigid part of the vehicle.

A pre-stressed wave mat having an active portion can be mounted on a resilient carrier cushion having a form which can be adapted to the form of the supporting surface. Such a carrier cushion may, for example, be a cushion filled with gas or liquid or have the form of a resilient cushion, such as a cushion filled with foamed plastics. When the cushion is filled with a gas or liquid, it may comprise sections by means of which a vehicle with which the cushion co-operates can be orientated horizontally by varying the pressure in the different sections of the cushion.

Figure 10:
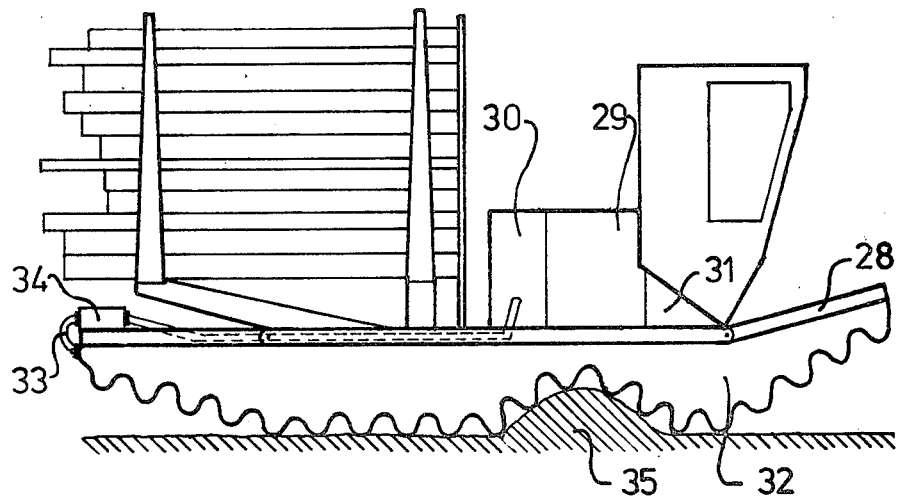
FIG. 10 illustrates a log-carrying vehicle constructed in accordance with the invention.

A vehicle according to the invention is schematically illustrated in FIG. 10. The vehicle comprises a rigid part 28 having a motor 29, a compressor 30 and an oil tank 31. The rigid part 28 is supported on a large carrier cushion 32. The underside of the carrier cushion is provided with inflatable drive cushions (see FIG. 8) in a manner such that waves can be formed and moved along the surface by filling and emptying the cushions in accordance with a given cycle. Hoses 33 are drawn along the underside of the carrier cushion 32 and connected to the drive cushions. The hoses are connected to a valve unit 34 which, in turn, is connected to the compressor 30. The valve unit 34 controls the filling and emptying of the drive cushions. When the vehicle meets an obstacle 35, the carrier cushion 32 is moulded to the shape of the obstacle thereby ensuring close contact with the support surface. The contact surface is constantly large and therefore good accessibility and low contact pressure is obtained. The damage to the ground will be negligible.

Figure 11:
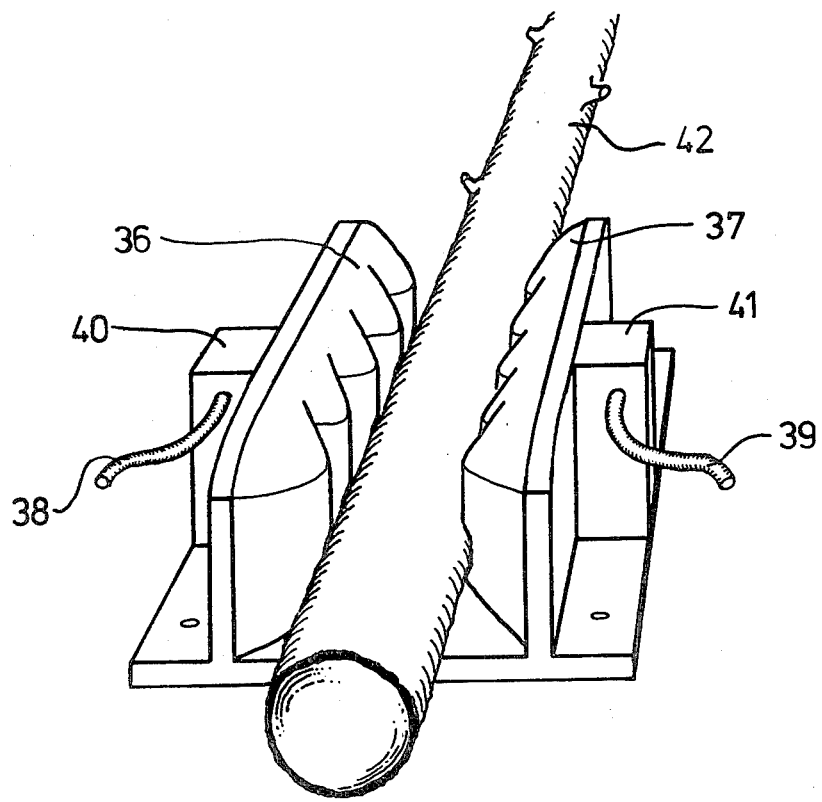
FIG. 11 illustrates a device for advancing tree trunks in accordance with the invention.

An arrangement according to the invention may be made, for instance, in the shape of a feeding device for trunks and logs, as illustrated in FIG. 11. This device comprises two mouldable carrier cushions 36 and 37 which face each other and which are so designed that waves can be formed and moved in the surfaces of the carrier cushions. The surfaces of the carrier cushions are provided with inflatable drive cushions (see FIG. 8) which create and move said waves. The drive cushions are supplied with oil from a compressor through hoses 38 and 39. Two valve units 40 and 41 control the filling and emptying sequence, respectively. A tree trunk 42 placed between the advancing means will be advanced in the opposite direction to the wave propagation direction in the active portions of the carrier cushions 36 and 37. The carrier cushions will mould themselves to the shape of the trunk and effectively advance the trunk without causing damage thereto.

When a carrier cushion of the type used in the FIG. 11 embodiment is arranged with the active portion substantially horizontal, it can also serve as a conveyor. Objects in contact with the wave crests of such a conveyor will in accordance with the above be transported in opposite direction to the direction in which the waves are propagated, which means that it can also be used to separate large objects from smaller objects, since smaller objects which fall down into the valleys between the wave crests will naturally be conveyed in the direction of propagation of the waves.

A common feature of all the aforedescribed embodiments is that there is used at least one active portion having a wave mat which is stationary relative to the device provided with said active portion, in which mat waves are moved relative to said device. The method of creating and moving waves, however, can be varied as desired and the aforedescribed embodiments are not to be considered as restrictive of the invention. The invention can be applied in many fields and the aforedescribed fields of use are only to be considered as examples in which the invention can be applied.

What we claim is:

1. A method of obtaining a translatory movement between two mutually contacting bodies, wherein at least one wave is caused to move along at least one active portion of at least one of said bodies, said portion being in contact with the other of said bodies, and wherein the wave either causes an interruption in said contact between said bodies and separates two parts of said active portion which is in contact with the other of said bodies, or forms a contact between said bodies and separates two parts of said active portion which are not in contact with said other body, thereby causing the distance between two arbitarily selected points of respective pairs of said parts measured along the surface of the active portion to be longer than the shortest distance between said points;

and including the step of
advancing the waves by means of at least one roll which is displaced relative to the active portion.

2. Method according to claim 1, wherein the active portion comprises a closed space;
and further including the step of generating an overpressure with respect to atmospheric pressure within said closed space.

3. Method according to claim 2, wherein the step of generating said overpressure comprises at least one of: providing a fluid overpressure within said space; filling said space with resilient material which, when compacted, reacts in the form of counterpressure.

4. An arrangement for obtaining a translatory movement of one body relative to another with which it is in contact, said arrangement comprising
at least one body having at least one active portion intended to be brought into contact with the other body and laong which portion at least one wave can be caused to move,
said wave either causing an interruption in the contact between said bodies and separating two parts of said active portion which are in contact with the other of said bodies, or forming a contact between the bodies and separating two parts of said active portion which are not in contact with the other of said bodies,
thereby causing the distance between two arbitrarily selected points of respective pairs of said parts measured along the surface of the active portion to be longer than the shortest distance between said points; and
at least one roll which is displaceable relative to the active portion for advancing waves therein.

5. An arrangement according to claim 4, wherein the action portion has the form of a continuous path.

6. An arrangement according to claim 4, wherein the active portion comprises a wave mat in which waves are pre-formed.

7. An arrangement according to claim 4, wherein the active portion comprises an outer flexible layer which at least partially defines a space in which an internal pressure above ambient pressure prevails.

8. An arrangement according to claim 7, wherein said space is filled with an elastic material, e.g. foamed plastics.

9. An arrangement according to claim 4, wherein the active portion is produced homogeneously in an elastic material, e.g. foamed plastics.

10. Method of obtaining a translatory movement between two mutually contacting bodies, wherein at least one wave is caused to move along at least one active portion of at least one of said bodies, p1 said portion being in contact with the other of said bodies, and wherein the wave either causes an interruption in said contact between said bodies and separates two parts of said active portion which is in contact with the other of said bodies, or forms a contact between said bodies and separates two parts of said active portion which are not in contact with said other body,
thereby causing the distance between two arbitrarily selected points of respective pairs of said parts measured along the surface of the active portion to be longer than the shortest distance between said points;
said active portion comprising a closed space;
and including the steps of
generating an overpressure with respect to atmospheric within said closed space;
positioning hollow cushions within said closed space, oriented longitudinally with respect to said motion;
and wherein the step of advancing the waves comprises cyclically filling, and evacuating, said hollow cushions with a compressed fluid to cyclically expand and contract said cushions in said space to form a continuous movable wave therein.

11. Method according to claim 10, wherein the step of generating said overpressure comprises at least one of: providing a fluid overpressure within said space; filling said space with resilient material which, when compacted, reacts in the form of counterpressure.

12. An arrangement for obtaining a translatory movement of one body relative to another with which it is in contact, said arrangement comprising
at least one body having at least one active portion intended to be brought into contact with the other body and laong which portion at least one wave can be caused to move,
said wave either causing an interruption in the contact between said bodies and separating two parts of said active portion which are in contact with the other of said bodies, or forming a contact between the bodies and separating two parts of said active portion which are not in contact with the other of said bodies,
thereby causing the distance between two arbitrarily selected points of respective pairs of said parts measured along the surface of the active portion to be longer than the shortest distance between said points;
wherein the active portion comprises an outer flexible layer defining a closed space therein in which an internal pressure above ambient atmospheric pressure prevails, and fluid-expandable cushions located within said closed space adapted to be cyclically filled and evacuated to form the advancing waves in said active portion.

13. Arrangement according to claim 12, wherein said space is filled with an elastic material.

* * * * *

UNITED STATES PATENT AND TRADEMARK OFFICE
CERTIFICATE OF CORRECTION

PATENT NO. : 4,227,608
DATED : October 14, 1980
INVENTOR(S) : Bjorn J.V. ALFTHAN It is certified that error appears in the above-identified patent and that said Letters Patent are hereby corrected as shown below:

Column 7, line 53, claim 10, line 3, delete "pl"

Signed and Sealed this

Seventeenth Day of February 1981

[SEAL]

Attest:

RENE D. TEGTMEYER

Attesting Officer    Acting Commissioner of Patents and Trademarks